United States Patent [19]
Arci et al.

[11] Patent Number: 5,761,381
[45] Date of Patent: Jun. 2, 1998

[54] COMPUTER SYSTEM USING GENETIC OPTIMIZATION TECHNIQUES

[75] Inventors: Francesco Davide Luigi Arci, Bath; Maurice Carnduff Jamieson; Mark Andrew Shuttleworth, both of Reading, all of Great Britain

[73] Assignee: International Computers Limited, Putney, United Kingdom

[21] Appl. No.: 691,297

[22] Filed: Sep. 1, 1996

[30] Foreign Application Priority Data

Aug. 31, 1995 [GB] United Kingdom ............ 9517775

[51] Int. Cl.$^6$ ........................................... G06F 15/18
[52] U.S. Cl. ........................ 395/13; 706/13; 706/19
[58] Field of Search ............................ 395/13, 11, 21, 395/22

[56] References Cited

U.S. PATENT DOCUMENTS

| | | | |
|---|---|---|---|
| 5,148,513 | 9/1992 | Koza et al. | 395/13 |
| 5,400,436 | 3/1995 | Nara et al. | 395/13 |
| 5,485,390 | 1/1996 | LeClair et al. | 364/474.24 |
| 5,568,590 | 10/1996 | Tolson | 395/13 |
| 5,581,657 | 12/1996 | Lyon | 395/13 |

FOREIGN PATENT DOCUMENTS

WO91/14990  10/1991  WIPO .............. G06F 15/18

OTHER PUBLICATIONS

Bellgard et al. "Some Experiments on the Use of Genetic Algorithms in a Boltzmann Machine, " Neural Networks, 1991 IEEE Int'l. Conf., pp. 2645–2652.

Shonkwiler et al. "Genetic Algorithm/Neural Network Synergy For Nonlinearly Constrained Optimization," Combinations of Genetic Algorithms and Neural Networks, 1992 Workshop, pp. 248–257.

(List continued on next page.)

*Primary Examiner*—Tariq R. Hafiz
*Attorney, Agent, or Firm*—Lee, Mann, Smith, McWilliams, Sweeney & Ohlson

[57] ABSTRACT

A computer system comprises at least one genetic optimization agent holding a pool of genotypes, representing possible solutions to a problem. The genetic optimization agent generates new genotypes from the pool, evaluates the new genotypes according to predetermined fitness criteria, and selects the fittest of the genotypes to form a new generation of genotypes in the pool. The system also includes a number of further agents, for generating further solutions to the problem, using different techniques, such as simulated annealing, constraint logic, and neural networks. These further solutions are also represented by genotypes. The genetic optimization agent imports genotypes from the further agents and adds them to its pool of genotypes for breeding and selection. The genetic optimization agent thus provides a way of integrating a number of different problem-solving agents, in such a way as to achieve synergy between them.

4 Claims, 3 Drawing Sheets

OTHER PUBLICATIONS

Adler "Genetic Algorithms and Simulated Annealing: A Marriage Proposal," Neural Networks, 1993 Int'l. Conf., pp. 1104–1109.

Kanoh "Genetic Algorithms for Constraint Satisfaction Problems," Systems, Man, and Cybernetics, 1995 Int'l Conf., vol. 1, pp. 626–631.

Dozier "Solving Small and Large Scale Constraint Satisfaction Problems Using a Heuristic–Based Microgenetic Algorithm," Evolutionary Computation, 1994 Conf., pp. 306–311.

Eiben "Solving Constraint Satisfaction Problems Using Genetic Algorithms," Evolutionary Computation, 1994 Conf., pp. 542–547.

Weijer, "Using genetic algorithms for an artificial neural network model inversion", Chemometrics and Intelligent Laboratory Systems, vol. 20, No. 1, Aug. 1, 1993, pp. 45–55.

Adler, "Genetic Algorithms and Simulated Annealing: A Marriage Proposal", Proc of the International Conf. On Neural Networks, vol. 2, Mar. 28, 1993, pp. 1104–1109.

Ravechandran, "Model–Based Matching Using a Hybrid Genetic Algorithm", Proc. of Int'l. Conf. On Robotics and Auto, Conf. 11, May. 8, 1994, pp. 2064–2069.

Moed, "Reducing The Search Time Of A Steady State Genetic Algorithum Using the Immaigration Operator", Proc. of Int'l. Conf. On Tools for Artif. Intell., Conf. 3, Nov. 10, 1991, pp. 500–501.

PARENTS          OFFSPRING

COMPUTER SYSTEM USING GENETIC OPTIMIZATION TECHNIQUES

BACKGROUND TO THE INVENTION

This invention relates to computer systems for problem solving. More specifically, the invention is concerned with a novel use of genetic optimization techniques in such a system.

Genetic optimization is a technique for solving complex non-deterministic problems by a process based on evolution and natural selection. The parameters to the problem are encoded in data structures that are modelled on chromosomes and genes. An individual solution to the problem is represented by a "genotype" that comprises a particular pattern of these chromosomes. The genetic optimization process takes a pool of such genotypes and breeds them to make new genetic combinations. It then evaluates each individual for fitness (i.e. how good that particular solution is), and selects the fittest for further breeding. By repeating this process, possibly thousands or millions of times, a very good solution frequently emerges.

For further details of genetic optimization techniques, reference is made to David E. Goldberg, Genetic Algorithms in Search, Optimization and Machine Learning, Addison-Wesley, Reading Ma, 1989.

For particularly complex non-deterministic problems however, the search spaces become so huge that relying on genetic optimization alone is sometimes not enough. It may generate millions of genotypes that by chance are nowhere near an optimal solution and do not converge towards one quickly.

The conventional answer is to add problem-specific intelligence into the genetic optimization process. This makes it create genotype encodings based pragmatic knowledge and constraints from the real-world issues. This does help the genetic optimization process to home in on good solutions early in its search. However it has several drawbacks:

The genetic optimization process runs slower and therefore does far fewer iterations, reducing the degree of improvement in the fitness of solution that can be achieved in a given time.

Assumptions built into the intelligent part can actually steer the genetic optimization process away from innovative and radical solutions that just may be far more effective.

The solver engine itself ceases to be generic and cannot be reused without modification.

In addition, not all problems are suitable for solving by genetic optimization. Some may be more suited to other known techniques such as simulated annealing, constraint reasoning or neural networks. However, it is not currently possible to decide a priori which technique will definitely be best for a given problem. Furthermore even a specific problem may be data-sensitive: that is, with one pattern of data the genetic optimization process may find a good answer quickly; but with different data a different technique may happen to work best.

The object of the present invention is to overcome these problems in a novel manner.

SUMMARY OF THE INVENTION

According to the invention there is provided a computer system comprising:

(a) at least one genetic optimization agent comprising means for storing a pool of genotypes, representing a plurality of possible solutions to a problem, encoded in a predetermined manner, breeding means for generating new genotypes from said pool of genotypes, evaluation means for evaluating said new genotypes according to predetermined fitness criteria, and selection means for selecting the fittest of the genotypes to form a new generation of genotypes in said pool; and (b) at least one further agent for generating further solutions to said problem, using other techniques, and for representing said further solutions by further genotypes;

(c) wherein said genetic optimization agent includes means for importing said further genotypes from said further agent and adding them to said new generation of genotypes in said pool for breeding and selection.

As will be shown, in such a system, the genetic optimization agent provides a framework within which a number of different problem-solving techniques can be integrated, in such a way as to achieve synergy between the different techniques.

DESCRIPTION OF AN EMBODIMENT OF THE INVENTION

One embodiment of the invention will now be described by way of example with reference to the accompanying drawings.

Figure 1:
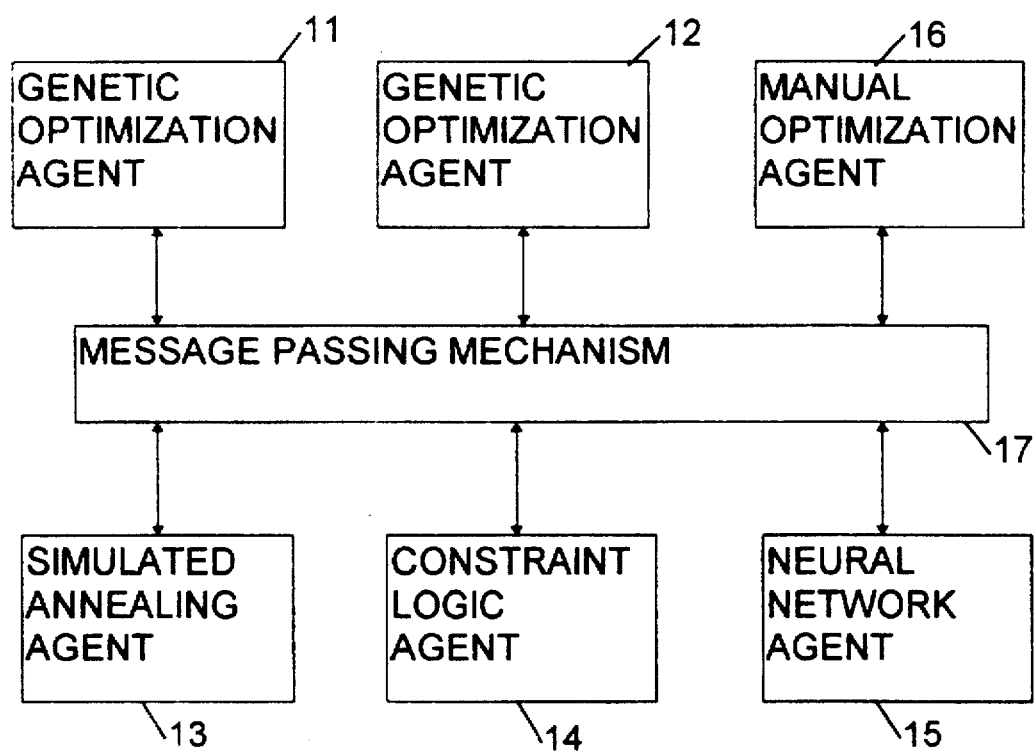
FIG. 1 is a block diagram of a computer system embodying the invention.

FIG. 1 shows a computer system 10, comprising a plurality of agents 11–16. These agents may be processes running on separate processors. Alternatively one or more of the agents may run as time-sharing processes on the same processor. The agents can communicate with each other by a message passing mechanism 17, which allows any one of the agents to send a message to any other agent.

The system includes at least one genetic optimization agent, capable of solving problems by genetic optimization techniques. In this example there are two genetic optimization agents 11,12 but in other examples of the invention there may be only one genetic optimization agent, or more than two genetic optimization agents. The genetic optimization agent will be described in more detail below.

The system also includes one or more further agents which are capable of solving problems by other (non-genetic) techniques. In this example, these further agents comprise a simulated annealing agent 13, a constraint logic programming (CLP) agent 14, and a neural network agent 15. Simulated annealing, CLP, and neural networks are well-known techniques in the art, and details of these processes do not form any part of the present invention, so that it is not necessary to describe the agents 13–15 in any further detail. In this example, the system also includes a manual optimization agent 16, which allows a human user to create and to modify solutions manually, as will be described in more detail below.

In operation, each of the agents 11–16 attempts to create possible solutions to a given problem, using its own particular method. Each of these possible solutions is encoded in some predetermined manner, for example as a string of bits. The encoded solution is referred to as a "genotype". All the agents use the same predetermined genotype coding scheme, so that any genotype can be understood by all the agents. For example, in a transport scheduling problem, each genotype may contain coded information representing a particular sequence of collections and deliveries to be performed by each of a number of truck drivers.

Figure 2:
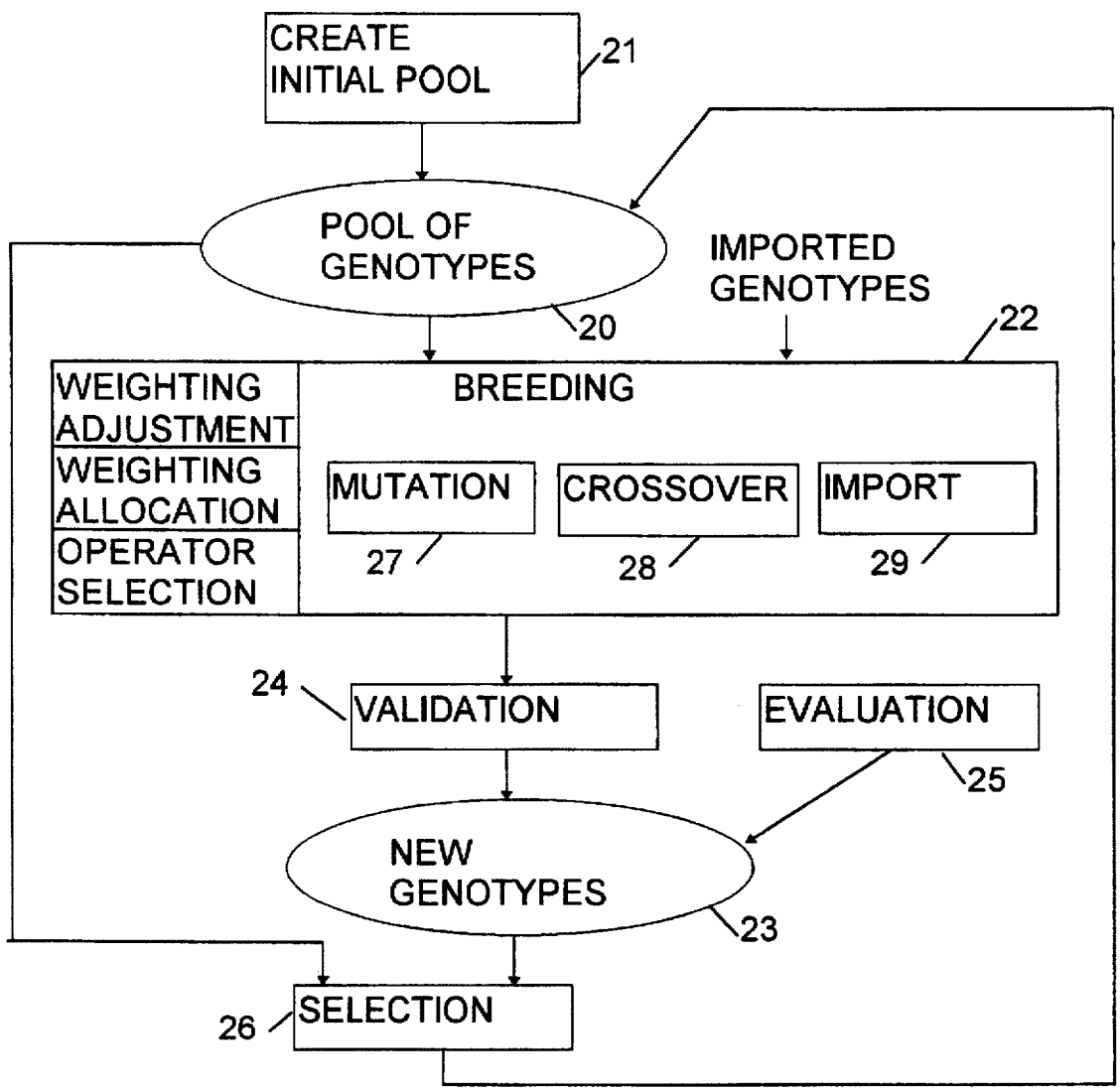
FIG. 2 is a schematic diagram illustrating a genetic optimization agent forming part of the system.

The genetic optimization agent 11 or 12 will now be described in more detail with reference to FIG. 2.

The genetic optimization agent maintains a pool of genotypes 20, representing a current generation of solutions to the problem in question. When the genetic optimization agent is started up, a process 21 creates an initial generation of genotypes, for example by randomization, or by using genotypes stored from a previous run.

The genetic optimization agent includes a breeding process 22, which processes the genotypes in the pool 20, to produce a set of new genotypes 23. Each new genotype passes through a validation process 24 which checks whether the genotype satisfies any problem-specific constraints. For example, in the transport scheduling problem, the validation process may check whether the delivery schedule represented by the genotype would involve a driver working for more than a maximum permitted number of hours. If the genotype does not satisfy the constraints, the validation process performs a "gene-repair" operation, by searching for values which satisfy the constraints. If such values cannot be found, the new genotype is discarded.

The genetic optimization agent also includes an evaluation process 25, which evaluates the new genotypes, to produce a fitness value for each one, indicating how good a solution the genotype represents. For example, in the transport scheduling problem, the fitness value may represent the efficiency of the delivery schedule represented by the genotype.

The genetic optimization agent further includes a selection process 26 which selects the best of the genotypes (both from the genotype pool 20 and the new genotype set 23), and places the selected genotypes in the genotype pool. The worst of the genotypes are discarded.

The breeding, validation, evaluation and selection processes are executed cyclically, to produce successive generations of genotypes. This loop continues until some criterion is satisfied, such as one of the following:

A fixed number of generations have been produced.

The percentage improvement in the average fitness value drops below a predetermined level.

A predetermined time has elapsed.

The breeding process 22 comprises a number of operators, including a mutation operator 27, a crossover operator 28, and an import operator 29. Each of these operators has a weighting value associated with it, which determines the probability of using that operator. These weighting values are adjusted for successive generations, so as to increase the probability of use of those operators that produce fitter genotypes.

Figure 3:
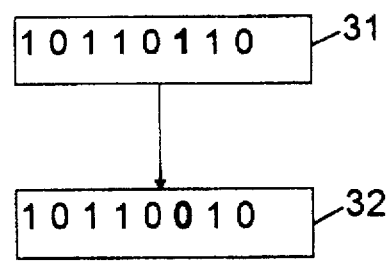
FIG. 3 is a schematic diagram illustrating a mutation operation used by the genetic optimization agent.

The mutation operator 27 takes one of the genotypes from the pool 20, and mutates it in some manner. For example, in the case of bitwise encoded genotypes, the mutation may consist of inverting a randomly-selected one of its bits. As an illustration, FIG. 3 shows such a mutation operator applied to a genotype 31, where the fifth bit is selected for inversion.

Figure 4:
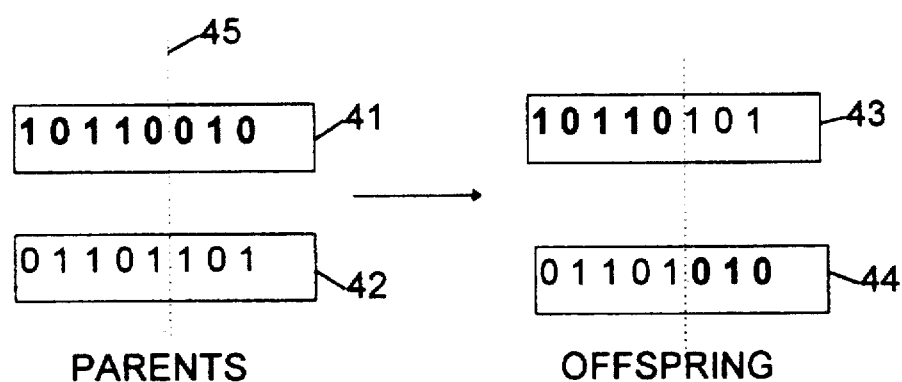
FIG. 4 is a schematic diagram illustrating a crossover operation used by the genetic optimization agent.

The crossover operator 28 selects two of the genotypes from the pool 20 as "parents", and generates two new "offspring" genotypes from these, by swapping part of their genetic information. The parents are chosen randomly, with a probability based on their fitness values, so that genotypes with higher fitness values will tend to produce more offspring. As an example, FIG. 4 shows one possible crossover operator applied to two parent genotypes 41,42 to produce two offspring genotypes 43,44. A crosspoint 45 is randomly selected, in this example after the fifth bit. The first offspring 43 is created by taking the bits of the first parent 41 preceding crosspoint, and the bits of the second parent 42 that follow the crosspoint. Similarly, the second offspring 44 is created by taking the bits of the second parent 42 preceding crosspoint, and the bits of the first parent 41 that follow the crosspoint. It will be appreciated that in practice other forms of crossover operator may be used, depending on the way the genotypes are encoded.

The import operator 29 sends a message to one of the other agents in the system, requesting it to send the best genotype so far created by that other agent. When the requested genotype is received, it is validated and added to the set of new genotypes 23 in exactly the same way as locally generated genotypes, produced by the mutation and crossover operators. The imported genotype will then be available for further evolution by the genetic optimization agent.

The manual optimization agent 16 allows the user to select the current best genotype from any of the other agents 11–15, and to display the solution represented by the selected genotype on a screen in some readily-understandable form. The agent 16 also allows the user to manipulate the displayed solution, in an attempt to improve it. For example, in the case of the transport scheduling problem, the agent 16 may display the delivery schedule represented by the genotype in the form of a Gantt chart. The user may then modify this Gantt chart, by using a mouse or other pointer device to drag one or more bars on the chart to different locations. When the user has finished, the agent 16 reconverts the modified solution into a genotype, and makes this genotype available for export to the genetic optimization agent. The genetic optimization agent will then import this genotype, validate it, repair it, and add it to the set of new genotypes, as described above.

Thus, it can be seen that the user can browse through the best solutions so far, modify the Gantt chart using his/her skill and experience, and then offer this new genotype up to genetic optimization agent. If the genotype represents a good new starting point, it will then be used by the genetic optimization agent to generate still better solutions.

In summary, it can be seen that the genetic optimization agent will constantly import fit-looking genotypes from other agents and try to evolve them into even fitter individuals. In the meantime, the other agents will be trying to create good solutions their own way. If one of these other agents happens to come up with a particularly brilliant solution very quickly, it offers up this solution to the genetic optimization agent for further refinement. If not, the genetic optimization agent will operate in the normal manner, to generate its own solution.

What this means in practice is that the genetic optimization process is doing two things. First, it is doing its normal job of evolving individual solutions; but second, it is also in effect evolving the fittest techniques for solving the particular problem with the particular pattern of input data.

In terms of solving commercial problems this has a particularly important advantage. It is possible initially to use off-the-shelf solver agents alone to address a problem.

As more problem-tailored approaches are developed, new agents can then be simply added into the architecture without changing the existing agents. If the new agents work well, a good solution will be found more quickly; if they do not, their results will simply be ignored by the genetic optimization agent. This effectively de-risks developments in one of the most high-risk areas of current computer application development.

Some possible modifications

It will be appreciated that many modifications may be made to the system described above without departing from the scope of the present invention. For example, some possible modifications are as follows.

The system may include a central pool of genotypes that have been offered for export by the agents. In this case, whenever the genetic optimization agent requires to import a new genotype, it would obtain it from this central pool, rather than from the other agents.

The system may include a shared evaluation agent, which provides an evaluation service for each of the genetic optimization agents in the system.

Instead of just the best genotype, the import operator may import several best genotypes from each other agent (assuming that more than one genotype is available in that other agent).

Some method, such as tagging, may be used to avoid a recently exported genotype being re-imported into the same agent.

A mechanism may be provided to keep track of the sources of genotypes, so as to keep a history of which technique worked best at what stage of optimization.

We claim:

1. A computer system for solving an optimization problem, the system comprising at least first and second optimization agents, and a message passing mechanism, connected to said optimization agents, for passing messages between said optimization agents;

wherein said first optimization agent comprises means for using a non-genetic optimization technique to generate, independently of said second optimization agent, genotypes representing solutions to said problem;

and wherein said second optimization agent comprises:

(a) means for storing a pool of genotypes, representing solutions to said problem;

(b) breeding means, coupled to said pool of genotypes, for generating new genotypes from said pool of genotypes;

(c) means, coupled to said breeding means, for evaluating said new genotypes according to predetermined fitness criteria, and for selecting fittest of said new genotypes, to form a new generation of genotypes in said pool; and (d) importing means, coupled to said breeding means, for importing genotypes from said first optimization agent, by way of said message passing mechanism and adding them to said pool of genotypes.

2. A system according to claim 1 wherein said first optimization agent comprises one of the following:

(a) a simulated annealing agent, (b) a constraint logic agent, and (c) a neural network agent.

3. A system according to claim 1, further including a manual optimization agent comprising:

(a) means for importing a selected genotype from one of said optimization agents, by way of said message passing mechanism; and (b) means for allowing a user to manipulate said selected genotype to generate a modified genotype;

and wherein said second optimization agent comprises means for importing said modified genotype from said manual optimization agent, by way of said message passing mechanism, and adding it to said pool of genotypes.

4. A system according to claim 1 wherein said breeding means comprises:

(a) a plurality of operators for operating on existing genotypes in said pool to produce new genotypes;

(b) means for allocating a weighting value to each of said operators;

(c) means for selecting said operators for use, with probabilities determined by the weighting values of said operators; and (d) means for adjusting said weighting values by increasing the weighting values of operators that have produced fitter genotypes and decreasing the weighting values of operators that have produced less fit genotypes.

* * * * *